US009950279B2

(12) United States Patent
Cummings

(10) Patent No.: US 9,950,279 B2
(45) Date of Patent: Apr. 24, 2018

(54) APATITE SURFACE NEUTRALIZATION WITH ALKALI SOLUTIONS

(71) Applicant: Bio-Rad Laboratories, Inc., Hercules, CA (US)

(72) Inventor: Larry J. Cummings, Pleasant Hill, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 0 days.

(21) Appl. No.: 15/654,275

(22) Filed: Jul. 19, 2017

(65) Prior Publication Data

US 2017/0312653 A1 Nov. 2, 2017

Related U.S. Application Data

(63) Continuation of application No. 15/432,755, filed on Feb. 14, 2017, now Pat. No. 9,737,829, which is a continuation of application No. 13/363,670, filed on Feb. 1, 2012, now Pat. No. 9,592,540.

(60) Provisional application No. 61/438,729, filed on Feb. 2, 2011.

(51) Int. Cl.
*B08B 3/00* (2006.01)
*B01D 15/20* (2006.01)
*B08B 3/08* (2006.01)
*B01J 20/34* (2006.01)

(52) U.S. Cl.
CPC ........ *B01D 15/203* (2013.01); *B01J 20/3475* (2013.01); *B08B 3/08* (2013.01)

(58) Field of Classification Search
CPC ....... B01D 15/203; B01J 20/3475; B08B 3/08
See application file for complete search history.

(56) References Cited

U.S. PATENT DOCUMENTS

| | | | |
|---|---|---|---|
| 3,737,516 A | 6/1973 | Jenner | |
| 4,053,561 A | 10/1977 | Irani | |
| 4,859,342 A | 8/1989 | Shirasawa et al. | |
| 5,332,503 A | 7/1994 | Lee et al. | |
| 5,744,587 A | 4/1998 | Alaska et al. | |
| 5,783,217 A | 7/1998 | Lee et al. | |
| 6,156,178 A | 12/2000 | Mansfield et al. | |
| 6,602,697 B1 | 8/2003 | Cook, III | |
| 7,122,641 B2 | 10/2006 | Vedantham et al. | |
| 7,476,722 B2 | 1/2009 | Vedantham et al. | |
| 7,597,804 B2 | 10/2009 | Duval et al. | |
| 7,659,373 B2 | 2/2010 | Burg et al. | |
| 7,767,447 B2 | 8/2010 | Breidenthal et al. | |
| 7,851,652 B2 | 12/2010 | Daly | |
| 8,058,407 B2 | 11/2011 | Sun et al. | |
| 8,067,182 B2 | 11/2011 | Kelley et al. | |
| 8,093,364 B2 | 1/2012 | Gagnon et al. | |
| 8,529,859 B2 | 9/2013 | Soules et al. | |
| 8,569,032 B2 | 10/2013 | Sakuraba et al. | |
| 8,895,707 B2 | 11/2014 | Cummings et al. | |
| 8,951,807 B2 | 2/2015 | Cummings et al. | |
| 9,469,672 B2 | 10/2016 | Sun et al. | |
| 2003/0166869 A1 | 9/2003 | Vedantham et al. | |
| 2004/0254267 A1 | 12/2004 | Nagae | |
| 2004/0265298 A1 | 12/2004 | Lin | |
| 2005/0209100 A1 | 9/2005 | Duval et al. | |
| 2006/0246544 A1 | 11/2006 | Kang et al. | |
| 2007/0060741 A1 | 3/2007 | Kelley et al. | |
| 2009/0047723 A1 | 2/2009 | Jensen et al. | |
| 2009/0186396 A1 | 6/2009 | Gagnon | |
| 2009/0187005 A1 | 7/2009 | Gagnon | |
| 2009/0264651 A1 | 10/2009 | Daly | |
| 2009/0318674 A1 | 12/2009 | Gagnon | |
| 2010/0113751 A1 | 5/2010 | Sun et al. | |
| 2010/0291059 A1 | 11/2010 | Sakuraba et al. | |
| 2011/0178276 A1 | 7/2011 | Cummings et al. | |
| 2011/0224065 A1 | 9/2011 | Soules et al. | |
| 2012/0149636 A1 | 6/2012 | Kraynov et al. | |
| 2012/0192901 A1* | 8/2012 | Cummings | B01D 15/203 134/27 |
| 2013/0323812 A1 | 12/2013 | Cummings et al. | |
| 2015/0367252 A1 | 12/2015 | Snyder et al. | |
| 2015/0368103 A1 | 12/2015 | Cummings | |
| 2017/0121365 A1* | 5/2017 | Snyder | C07K 1/22 |
| 2017/0312653 A1* | 11/2017 | Cummings | B01D 15/203 |

FOREIGN PATENT DOCUMENTS

| | | |
|---|---|---|
| CN | 1298952 A | 6/2001 |
| EP | 0256836 A1 | 2/1988 |
| EP | 1081221 A1 | 3/2001 |
| EP | 2138505 B1 | 6/2014 |
| WO | 03/059935 A2 | 7/2003 |
| WO | 06/099308 A2 | 9/2006 |
| WO | 2008/025748 A1 | 3/2008 |
| WO | 2008/113011 A2 | 9/2008 |
| WO | 2009/017491 A1 | 2/2009 |
| WO | 2010/034442 A1 | 4/2010 |
| WO | 2010/148143 A1 | 12/2010 |

OTHER PUBLICATIONS

Gorbunoff et al.; "The interaction of proteins with hydroxyapatite—I. Role of protein charge and structure", 1984, analytical Biochemistry, vol. 136. No. 2. pp. 425-432.
Britsch, "Purification of Flavanone 3 beta-Hydroxylase from Petunia hybrida: Antibody preparation and Characterization of a Chemogenetically Defined Mutant", Archives of Biochemistry and Biophysics, 276(2):348-354 (1990).
CFT Ceramic Fluoroapatite. Instruction Manual. Bio-Rad Laboratories, Inc. Jan. 9, 2012 (date obtained from WayBackMachine).
CHT Ceramic Hydroxyapatite: Instruction Manual, 16 pages (2001) http://www.bio-rad.com/cmc_upload/0/000/039/227/Lit-611d.pdf.
Larsen et al., "Solubility Study of the Initial Formation of Calcium Orthophosphates from Aqueous Solutions at pH5-10", Arch Oral Biol., vol. 31, No. 9, pp. 565-572 (1986).

(Continued)

*Primary Examiner* — Sharidan Carrillo
(74) *Attorney, Agent, or Firm* — Kilpatrick Townsend & Stockton LLP

(57) ABSTRACT

The present invention discloses methods of neutralizing apatite surfaces, for example after a flow-through collection of a target and prior to cleaning the chromatography solid support.

18 Claims, No Drawings

(56) References Cited

OTHER PUBLICATIONS

Recillas et al., "Studies on the precipitation behavior of calcium phosphate solutions", Journal of Ceramic Processing Research, vol. 13, No. 1, pp. 5-10 (2012).
Schroder et al., "Hydroxyapatite chromatography: altering the phosphate-dependent elution profile of protein as a function of pH", Analytical Biochemistry, vol. 313, pp. 176-178 (2003).
Bankston, Theresa E., Dattolo, Laura, and Carta, Giorgio, "pH Transients in hydroxyapatite chromatography columns—Experimental evidence and phenomological modeling", Journal of Chromatography A, 1217 (2010) 2123-2131.
Extended European Search Report dated Dec. 17, 2014 for EP Application No. 11818724.4, 7 pages.
Extended European Search Report dated Dec. 17, 2015 for EP Application No. 13796784.0.
Extended European Search Report dated Jul. 18, 2014 for EP Application No. 12742721.9, 6 pages.
Extended European Search Report dated Jul. 21, 2014 for EP Application No. 11733384.9, 7 pages.
U.S. Appl. No. 13/006,022, filed Jan. 13, 2011 (25 pages).
U.S. Appl. No. 13/205,354, filed Aug. 8, 2011 (26 pages).
U.S. Appl. No. 13/891,502, filed May 10, 2013 (30 pages).
Office Action from U.S. Appl. No. 13/006,022, dated Jun. 29, 2012.
Office Action from U.S. Appl. No. 13/006,022, dated Nov. 15, 2012.
International Search Report and Written Opinion from PCT/US2015/037112, dated Sep. 29, 2015.
International Search Report and Written Opinion from PCT/US2015/037116, dated Sep. 16, 2015.
International Search Report and Written Opinion from PCT/US2015/037145, dated Oct. 6, 2015.
International Search Report and Written Opinion from PCT/US2012/023512, dated May 10, 2012.
The International Search Report from PCT/US2011/021158, dated Mar. 17, 2011.
The International Search Report from PCT/US2011/048082, dated Mar. 20, 2012.
The International Search Report from PCT/US2013/040591, dated Oct. 8, 2013.

\* cited by examiner

APATITE SURFACE NEUTRALIZATION WITH ALKALI SOLUTIONS

CROSS-REFERENCE TO RELATED PATENT APPLICATIONS

The present application is a continuation of U.S. patent application Ser. No. 15/432,755, filed on Feb. 14, 2017, now U.S. Pat. No. 9,737,829, issued on Aug. 22, 2017, which is a continuation of U.S. application Ser. No. 13/363,670 filed on Feb. 1, 2012, now U.S. Pat. No. 9,592,540, issued on Mar. 14, 2017, which claims benefit of priority to U.S. Provisional Patent Application No. 61/438,729, filed Feb. 2, 2011, each of which is incorporated by reference.

BACKGROUND OF THE INVENTION

Hydroxyapatite and fluorapatite, among other apatite solid supports, are used for purification of a wide variety of biomolecules, including proteins, carbohydrates, polynucleotides, and viral particles.

BRIEF SUMMARY OF THE INVENTION

The present invention provides for a method for cleaning an apatite solid surface following target molecule purification by a non-adsorbing flow through process. In some embodiments, the method comprises,
(a) contacting a sample comprising the target molecule to an apatite solid surface thereby flowing the target molecule past the apatite solid surface;
(b) neutralizing the apatite solid surface by contacting the apatite solid surface with a sufficient concentration and volume of an alkaline hydroxide; and
(c) cleaning the apatite solid surface.

In some embodiments, the alkaline hydroxide is selected from the group consisting of sodium hydroxide, potassium hydroxide and lithium hydroxide.

In some embodiments, the concentration of the alkaline hydroxide is between 0.1 and 1 M. In some embodiments, the concentration of the alkaline hydroxide is between 0.3 and 0.7 M.

In some embodiments, the cleaning comprises contacting the solid surface with a phosphate solution. In some embodiments, the phosphate solution has a pH at or between 6.5 and 10.0. In some embodiments, the phosphate concentration of the phosphate solution is at or between 0.1 and 1.0.

In some embodiments, the apatite is selected from the group consisting of hydroxyapatite and fluorapatite. In some embodiments, the apatite is ceramic hydroxyapatite or ceramic fluorapatite.

In some embodiments, the apatite is a non-ceramic apatite.

In some embodiments, the target molecule is a protein. In some embodiments, the protein is an antibody.

In some embodiments, the contacting comprises contacting the solid surface with a solution at a pH of between 5.0 and 7.5.

In some embodiments, the apatite solid support is in the form of a column.

DEFINITIONS

"Neutralizing the solid apatite surface" refers to treating the surface of the apatite surface such that the solid surface does not contain sufficient hydronium ions to significantly affect (i.e., cause a greater than 0.2 acidic pH shift of) the pH of a subsequent cleaning buffer.

"Antibody" refers to an immunoglobulin, composite, or fragmentary form thereof. The term may include but is not limited to polyclonal or monoclonal antibodies of the classes IgA, IgD, IgE, IgG, and IgM, derived from human or other mammalian cell lines, including natural or genetically modified forms such as humanized, human, single-chain, chimeric, synthetic, recombinant, hybrid, mutated, grafted, and in vitro generated antibodies. "Antibody" may also include composite forms including but not limited to fusion proteins containing an immunoglobulin moiety. "Antibody" may also include antibody fragments such as Fab, F(ab')2, Fv, scFv, Fd, dAb, Fc and other compositions, whether or not they retain antigen-binding function.

An "apatite solid surface" refers to fused nanocrystals (ceramic apatite), microcrystals, or compounded microcrystals. Ceramic apatites include, but are not limited to, ceramic hydroxyapatite (e.g., CHT™) or ceramic fluorapatite. Ceramic apatites are a form of apatite minerals in which nanocrystals are agglomerated into particles and fused at high temperature to create stable ceramic microspheres suitable for chromatography applications. Compounded microcrystals include but are not limited to HA Ultragel® (Pall Corp). Microcrystals include but are not limited to Bio-Gel HTP, Bio-Gel® HT, DNA-Grade HT (Bio-Rad) and Hypatite C (Clarkson Chromatography).

"Hydroxyapatite" refers to a mixed mode solid support comprising an insoluble hydroxylated mineral of calcium phosphate with the structural formula $Ca_{10}(PO_4)_6(OH)_2$. Its dominant modes of interaction are phosphoryl cation exchange and calcium metal affinity. Hydroxapatite is commercially available in various forms, including but not limited to ceramic, crystalline and composite forms. Composite forms contain hydroxyapatite microcrystals entrapped within the pores of agarose or other beads.

"Fluorapatite" refers to a mixed mode support comprising an insoluble fluoridated mineral of calcium phosphate with the structural formula $Ca_{10}(PO_4)_6F_2$. Its dominant modes of interaction are phosphoryl cation exchange and calcium metal affinity. Fluorapatite is commercially available in various forms, including but not limited to ceramic and crystalline composite forms.

"Sample" refers to any composition having a target molecule or particle of interest. A sample can be unpurified or partially purified. Samples can include samples of biological origin, including but not limited to blood, or blood parts (including but not limited to serum), urine, saliva, feces, as well as tissues.

An "alkaline hydroxide" refers to a metal alkali hydroxide comprising any cation elements in Group I of the periodic table, including, e.g., lithium (Li), sodium (Na), potassium (K) rubidium (Rb), cesium (Cs), and francium (Fr). Thus, exemplary alkaline hydroxides include, for example, NaOH, LiOH, and KOH.

"Flow-through mode" refers to an operational approach to chromatography in which the chromatography conditions are established so that a target molecule (from a sample) to be purified flows past the chromatography support upon application, while at least some other components of the sample are selectively retained, thus achieving removal of at least some non-target components of the sample.

DETAILED DESCRIPTION OF THE INVENTION

I. Introduction

The present invention is based, in part, on the surprising discovery that an alkaline hydroxide solution (e.g., NaOH) is useful to neutralize the surface of an apatite solid support following a flow through purification of a target molecule and before a cleaning step. Hydrogen (or hydronium) ions can accumulate on an apatite solid surface following flow through purification of a target molecule. Surprisingly, if one performs a subsequent cleaning step (e.g., with a 0.1-1.0 M phosphate solution) without first neutralizing the column, degradation of the column can occur by displacement of calcium ions in the apatite support. By neutralizing the solid support with an alkaline hydroxide solution prior to the cleaning step, one can avoid significant degradation that can otherwise occur to the apatite solid surface.

Initially, the sample containing the target molecule is contacted to the apatite surface in flow-through mode as is known in the chromatography arts. In some embodiments, the flow through comprises a solution of pH at or between 5.0 and 7.5. Exemplary buffers include, e.g., phosphate buffers, optionally also containing sodium (e.g., NaCl). Flow through may be conducted at fast linear flow rates such as 300-600 cm/hr. However slower linear flow rates such as 50-200 cm/hr are also applicable.

Optionally, the apatite surface is previously sanitized and/or equilibrated prior to adsorption of the target to the surface. After the target molecule is run past the solid support (e.g., though a column), the solid support is neutralized prior to cleaning.

"Flow-through mode" as it relates to the invention herein, refers to an operational approach to chromatography in which the buffer conditions are established so that intact non-aggregated target to be purified flows through the chromatography support, while other molecules (e.g., in some embodiments aggregates and other large molecules (including viruses) are selectively retained, thus achieving their removal. Flow-through mode conditions can be developed depending on the specific target desired. Without intending to limit the scope of the invention, the following description is provided as a guide for developing flow-through conditions as desired for a particular protein. An exemplary flow-through condition is, for example: Condition the column for flow though by sanitizing with 0.5-1.0 N NaOH, wash with 0.2 M sodium phosphate at pH 6.5-7.5, equilibrate the column with flow through buffer (5-20 mil sodium phosphate, pH 5.0-7.5), apply the sample and collect the flow though containing the target molecule, wash the column with 0.3-1 column volume of 1 M NaOH, and clean the column with 0.1-1M phosphate. However, any flow-through conditions are contemplated for the invention.

Neutralization occurs after the target has flowed through and optionally been collected. The neutralization comprises contacting the apatite surface with a sufficient amount of a solution comprising a sufficient concentration of an alkaline hydroxide. Exemplary alkaline hydroxides include, for example, NaOH, LiOH, and KOH, though other alkaline hydroxides can also be used as desired. In some embodiments, the alkaline hydroxide that neutralizes the apatite solid surface is between, e.g., 1-100 mM, 1-20 mM, 10-2000 mM, 10-1000 mM, 10-500 mM, 10-200 mM, or 10-100 mM, etc.

Instead of alkaline hydroxides, it is also believed that amino functional bases and alkaline carbonates can be used to neutralize the apatite surface as described herein for alkaline hydroxides. For example it is believed that neutralization can be achieved with any amino functional base triethyamine, Tris, ammonia, etc.). However the amino compound may form gas with the cleaning buffer and cause an ammonia-like odor. It is also believed that alkaline carbonates (e.g., lithium, sodium or potassium carbonate) will neutralize the apatite surface. However, $CO_2$ gas could form in the column causing back pressure.

Neutralization of the apatite surface can be readily measured. For example, one can monitor the pH of the chromatography effluent following the alkaline hydroxide treatment. A neutral apatite surface will result in a pH change of no more than 0.1 or 0.2 between the input and effluent following neutralization. For example, if the pH of the cleaning buffer is input at 7.0, the effluent would not drop to less than 6.8 during cleaning if the surface were neutralized. Alternatively, one can monitor calcium ions in the effluent to determine whether the surface is neutralized. In the presence of released free hydronium ion, apatite releases calcium. Thus, the presence of more calcium in the effluent than was in the input buffer indicates that the surface has not been neutralized.

An exemplary cleaning solution is a phosphate buffer of about 0.1-1.0 M and having a pH of about 6.5-10.0. However, any cleaning conditions are contemplated for the invention. The buffer may optionally also include other salts (e.g., KCl, NaCl), though salts are not generally necessary once the surface has been neutralized.

II. Apatites

Those of skill will appreciate that a number of types of apatite solid surfaces can be used in the invention. Commercial examples of ceramic hydroxyapatite include, but are not limited to CHT Type I and CHT Type II. Commercial examples of ceramic fluorapatite include, but are not limited to CFT™ Type I and CFT Type II. Unless specified, ceramic hydroxyapatite and ceramic fluorapatite refer to roughly spherical porous particles of any average diameter, including but not limited to about 10, 20, 40, and 80 microns. The choice of hydroxyapatite or fluorapatite, the type, and average particle diameter can be determined by the skilled artisan. Other non-ceramic types of apatite solid surfaces (including those sold as "gels") can also be used according at the invention. Examples of non-ceramic solid apatites include but are not limited to compounded microcrystals (e.g., HA Ultragel® (Pall Corp.)) and microcrystals (e.g., Bio-Gel HTP, Bio-Gel® HT, DNA-Grade HT (Bio-Rad) and Hypatite C (Clarkson Chromatography)).

In preparation for contacting the sample with the apatite support, the chemical environment inside the column is typically equilibrated. This can be accomplished, for example, by flowing an equilibration buffer through the column to establish the appropriate pH; conductivity; identity, molecular weight, and other pertinent variables.

In some embodiments, the sample preparation is also equilibrated to conditions compatible with the column equilibration buffer. In some embodiments, this involves adjusting the pH of the sample preparation prior to loading.

In some embodiments, after the column and sample preparation is equilibrated, the sample preparation is contacted with the column. The sample preparation can be applied at a linear flow velocity in the range of, for example, about 50-600 cm/hr. Appropriate flow velocity can be determined by the skilled artisan.

In some embodiments, the invention is practiced in a packed bed column, a fluidized/expanded bed column and/or a batch operation where the support is mixed with the sample preparation for a certain time. In some embodiments, an apatite support is packed in a column. In some embodiments, the apatite support is packed in a column of at least 5 mm internal diameter and a height of at least 25 mm.

Another embodiment employs the apatite support, packed in a column of any dimension to support preparative applications. Column diameter may range from less than 1 cm to more than 1 meter, and column height may range from less than 1 cm to more than 30 cm depending on the requirements of a particular application. Appropriate column dimensions can be determined by the skilled artisan.

After use, the mixed mode column can optionally be cleaned, sanitized, and stored in an appropriate agent, and optionally, re-used. Indeed, one benefit of the neutralization solution of the present invention is that degradation of an apatite column can be avoided or delayed. Thus, in some embodiments, one can use the column for ten or more times, e.g., more than 20, more than 30, more than 40 or more than 50 cycles of purification.

III. Uses

The methods of the invention can be used to purify essentially any target molecule in a complex sample. In some embodiments, the target molecule to be purified is a component of a biological sample. Examples of such components include but are not limited to proteins, lipids, sugars, carbohydrates, viral particles, amino acids, nucleic acids, and can include combinations thereof, e.g., a lipidated or glycosylated protein, or mixtures thereof. In some embodiments, samples to which the method is applied include unpurified or partially purified biomolecules from natural, synthetic, or recombinant sources. Unpurified samples can be derived from, e.g., plasma, serum, ascites fluid, milk, plant extracts, bacterial lysates, yeast lysates, or conditioned cell culture media. In some embodiments, partially purified samples come from unpurified preparations that have been processed by at least one chromatography, ultrafiltration, precipitation, other fractionation step, or any combination thereof. An exemplary target molecule is an antibody (including but not limited to a monoclonal antibody and/or antibody fragments) or other peptide or polypeptide. The chromatography step or steps can employ any method, including but not limited to size exclusion, affinity, anion exchange, cation exchange, protein A affinity, hydrophobic interaction, immobilized metal affinity chromatography, or mixed-mode chromatography. The precipitation step or steps can include, for example, salt or PEG precipitation, or precipitation with organic acids, organic bases, or other agents. Other fractionation steps can include but are not limited to crystallization, liquid:liquid partitioning, or membrane filtration. Ultrafiltration can include direct concentration of the sample and/or diafiltration.

EXAMPLE

The following example are offered to illustrate, but not to limit the claimed invention.

A chromatography column of apatite is equilibrated with 5 mM sodium phosphate buffer, pH 6.5, A sample solution of equilibration buffer or sample buffer containing a target molecule is applied to the apatite column and purification of the target molecule achieved by flowing it through the apatite. Adsorbed hydrogen ion is neutralized by eluting the column with sufficient amount of a strong base such as sodium, potassium or lithium hydroxide. Finally, the apatite is cleaned with a phosphate buffer of sufficient concentration to elute adsorbed biological compounds such as DNA, basic proteins and endotoxin, etc.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method for cleaning an apatite solid surface following target molecule purification by a non-adsorbing flow through process, the method comprising,
   (a) contacting a sample solution comprising the target molecule to an apatite solid surface thereby flowing the target molecule past the apatite solid surface;
   (b) neutralizing the apatite solid surface by contacting the apatite solid surface with a sufficient concentration and volume of an alkaline carbonate or amino base; and
   (c) after the step of neutralizing with the alkaline carbonate or amino base, cleaning the apatite solid surface, thereby eluting adsorbed biological compounds, wherein the cleaning comprises contacting the apatite solid surface with a phosphate solution.

2. The method of claim 1, wherein the neutralizing comprises neutralizing the apatite solid surface with the alkaline carbonate.

3. The method of claim 1, wherein the neutralizing comprises neutralizing the apatite solid surface with the amino base.

4. The method of claim 1, wherein the phosphate solution has a pH at or between 6.5 and 10.0.

5. The method of claim 1, wherein the phosphate solution is at or between 0.1 M and 1.0 M phosphate.

6. The method of claim 1, wherein the apatite is selected from the group consisting of hydroxyapatite and fluorapatite.

7. The method of claim 1, wherein the apatite is ceramic hydroxyapatite or ceramic fluorapatite.

8. The method of claim 1, wherein the apatite is a non-ceramic apatite.

9. The method of claim 1, wherein the target molecule is a protein.

10. The method of claim 1, wherein the sample solution is at a pH of between 5.0 and 7.5.

11. The method of claim 1, wherein the apatite solid surface is in the form of a column.

12. The method of claim 1 further comprising monitoring the neutralizing by measuring a hydroxide ion or a calcium ion concentration of an effluent.

13. The method of claim 1, further comprising, before the contacting, equilibrating the apatite solid surface with 5-20 mM sodium phosphate.

14. The method of claim 2, wherein the alkaline carbonate is selected from the group consisting of lithium carbonate, sodium carbonate, and potassium carbonate.

15. The method of claim 3, wherein the amino base is selected from the group consisting of triethylamine, Tris, and ammonia.

16. The method of claim 9, wherein the protein is a recombinant protein.

17. The method of claim 9, wherein the protein is an antibody.

18. The method of claim 9, wherein the protein is an antibody fragment.

* * * * *